United States Patent [19]
Christie

[11] Patent Number: 5,944,841
[45] Date of Patent: Aug. 31, 1999

[54] MICROPROCESSOR WITH BUILT-IN INSTRUCTION TRACING CAPABILITY

[75] Inventor: David S. Christie, Austin, Tex.

[73] Assignee: Advanced Micro Devices, Inc., Sunnyvale, Calif.

[21] Appl. No.: 08/834,246

[22] Filed: Apr. 15, 1997

[51] Int. Cl.[6] .................................................. G06F 11/27
[52] U.S. Cl. ............................................................ 714/38
[58] Field of Search .............................. 395/183.14, 221, 395/512, 183.06, 183.16; 364/718.03, 724.013; 371/21.1, 22.5, 50.1

[56] References Cited

U.S. PATENT DOCUMENTS

| | | | |
|---|---|---|---|
| 3,659,272 | 4/1972 | Price et al. .......................... | 395/183.21 |
| 4,349,873 | 9/1982 | Gunter et al. ........................... | 395/742 |
| 4,445,177 | 4/1984 | Bratt et al. ............................... | 395/595 |
| 4,870,573 | 9/1989 | Kawata et al. ........................... | 364/200 |
| 5,019,967 | 5/1991 | Wheeler et al. ......................... | 395/395 |
| 5,367,550 | 11/1994 | Ishida ........................................ | 377/39 |
| 5,379,301 | 1/1995 | Sato et al. .................................. | 371/19 |
| 5,485,574 | 1/1996 | Bolosky ............................. | 395/183.11 |
| 5,564,028 | 10/1996 | Swoboda et al. ........................ | 395/568 |
| 5,574,892 | 11/1996 | Christensen ............................. | 395/500 |
| 5,751,735 | 5/1998 | Tobin et al. ......................... | 395/183.06 |

OTHER PUBLICATIONS

Sites et al., "Multiprocessor cache Analysis Using ATUM," 15th Annual International Symposium on Computer Architecture, IEEE Feb., 1988, pp. 186–195.

Primary Examiner—Robert W. Beausoliel, Jr.
Assistant Examiner—Pierre E. Elisea
Attorney, Agent, or Firm—Conley, Rose & Tayon; Lawrence J. Merkel; B. Noel Kivlin

[57] ABSTRACT

A computer system employing an instruction tracing mechanism includes a memory and a CPU. The memory includes a trace buffer used to store records of the instruction tracing. Entries in the trace buffer are pointed to by a tracer pointer. The memory is coupled to the CPU via a bus interface unit. Instructions are passed from the memory to the CPU via the bus interface unit and are queued in an instruction cache, which includes a byte queue. The CPU further includes a control unit coupled to a control register, the tracer pointer and a maskable ROM. The control unit controls and activates the instruction tracing mechanism. In response to software sitting a bit in the control register, the control unit functions to retrieve a special tracing microcode sequence from MROM to provide a trace record of the instructions as they are passed to the instruction decoders. A counting mechanism may also be activated to count instructions and store the count in the memory. The computer system further includes a register file coupled to the instruction decoders and functional units, also coupled to instruction decoders, to receive and process the instructions.

22 Claims, 9 Drawing Sheets

| Not Used | Linear Target EIP | Target EIP | Target CS | Mode | Type |
|---|---|---|---|---|---|
| 32-bits | 32-bits | 32-bits | | 32-bits | |

Taken Branch Record
FIG. 5

| Initial Linear EDI | Initial Linear ESI | Initial ECX | Type |
|---|---|---|---|
| 32-bits | 32-bits | 32-bits | 32-bits |

Repeated String Instruction Info. Record
FIG. 6

| Not Used | Not Used | Final ECX | Type |
|---|---|---|---|
| 32-bits | 32-bits | 32-bits | 32-bits |

Repeated String Early Termination Record
FIG. 7

| 32-bits | 32-bits | 32-bits | 32-bits |
|---|---|---|---|
| | | ECX | Vector \| Reason \| Mode \| Type |

Exception / Interrupt Record
FIG. 8

| 32-bits | 32-bits | 32-bits | 32-bits |
|---|---|---|---|
| | Incoming TSS Base Address | Outgoing TSS Base Address | Reason \| Mode \| Type |

Task Switch Record
FIG. 9

| 32-bits | 32-bits | 32-bits | 32-bits |
|---|---|---|---|
| CR3 on move to CR3 | Linear EDI for non-repeated string instructions | Linear ESI for non-repeated string instructions | Type |

Special Record for String / CR3 Conditions
FIG. 10

MICROPROCESSOR WITH BUILT-IN INSTRUCTION TRACING CAPABILITY

FIELD OF THE INVENTION

The present invention relates to microprocessor instruction tracing and, more particularly, to an instruction tracing facility employing hardwired microcode memory.

BACKGROUND OF THE INVENTION

A primary technique used in the development of complex high performance microprocessors is trace driven modeling. Trace driven modeling involves the use of traces of significant events that occur in the course of executing programs of interest to drive a software model of a proposed hardware mechanism in order to determine how it behaves on such a sequence. A trace may contain various levels of information. An address trace, for example, contains the sequence of memory addresses used to access instructions and operands. An instruction trace contains instruction op-codes and register specifiers in addition to the sequence of memory addresses. Other traces may contain only branch instructions or exceptions. The information in a trace may thus take various forms that captures the sequence in which the events occur.

A primary benefit of the use of trace driven modeling is that the model does not need to understand how to execute the instructions in a program in order to determine proper program flow and model the behavior of the program. The actual flow is captured in the trace. This allows use of relatively simple models, thereby speeding up operation of the modeling and allowing a variety of options to be explored in a reasonable time. Generally speaking, a full instruction trace is the most useful for developing microprocessors. This allows modeling of all the features of a proposed design at once to take into account possible interactions between the various mechanisms and most accurately reflect the overall behavior of a design. Moreover, subsets of events can usually be derived from a full trace for more focused modeling.

Three primary methods for collecting traces are used. A first mechanism is to use the instruction stepping mechanism processors use for debug purposes. The instruction stepping mechanism typically allows debugged software to gain control after each instruction when a program of interest is executed. The debugged software can be set up to write information on the execution of each instruction to a file, thereby collecting a trace of program execution. The EFLAGS TF bit of the X86 architecture is such a mechanism. However, this mechanism runs very slowly, requiring many instructions in the debugged software to be executed for each instruction in the program being traced. In addition, the system software typically cannot be traced in this fashion, due to conflicts in the use of system resources between the system software and the debugged software. Traces are typically limited to a specific program and therefore cannot reflect the overall behavior of a system in which several programs and much system code may be running.

A second method of collecting traces is to add instructions to a particular program that generate a trace of certain information as the program executes. By using this information, typically in conjunction with the binary image of the program, a detailed trace of execution may be constructed. The trace generating instructions are typically inserted by a compiler. However, in order to use this method, the user must have accessed the source code. Furthermore, only a single program can be traced which means that related system activity will not be traced.

A third common method of collecting traces is to collect the cycle-by-cycle pin state of a processor as it executes code using a device such as a logic analyzer. This method is called a bus trace. Traces can be collected at normal processor speed at least until the capacity of the trace storage device has been reached. Advantages of this method are that it reflects real-time operation and is transparent to the system. Accordingly, the behavior of system code and all active programs can be captured. However, the external hardware required is often expensive. In addition, for a pipeline processor the bus activity for instruction fetching is asynchronous to the data references that the instructions make and it can be difficult to link an instruction with its memory references. Moreover, instructions may be fetched but not actually executed to the branches. Finally, bus activity reflects physical memory addressing. In a system which employs virtual memory, it may be desirable to have the virtual addresses for modeling related mechanisms such as translation lookaside buffers.

A fourth method, less commonly used, but possible on microcoded microprocessors, is to modify the microcode of each instruction such that as each instruction executes it generates an information record which is captured in the some matter such as writing it to memory. This typically has much less time overhead than debug software based tracing, and since it operates below the instruction level it is transparent to the system software thereby allowing the system software to be traced as well. However, this technique can only be used with a writeable microcode memory making it unsuitable for commercial microprocessors which must use higher density hardwire microcode memory due to space constraints.

Accordingly, there is a need for a mechanism that permits a more broad scope of instruction tracing while not possessing the inherent disadvantages set forth above.

SUMMARY OF THE INVENTION

Accordingly, there is provided a mechanism to generate instruction traces using hardwired microcode memory while accommodating its inherent limitations with regard to size. A processor according to one embodiment of the present invention includes an enable bit in a control register, a register which holds a pointer into the trace memory, a microcode-based tracing routine and a mechanism to cause the routine to be executed prior to each instruction.

More particularly, a processor according to one embodiment of the present invention includes an instruction cache for storing a plurality of instructions and a predecode unit and decoders coupled to the instruction cache. A control unit is coupled between the instruction cache and the decoders. The control unit can include an instruction alignment unit and a trace control unit. An MROM unit and a control register are further coupled to the control unit. The trace control unit is used to define a trace pointer to a predetermined region called a trace buffer in memory. The trace control unit is further configured to provide, for example by invoking an MROM routine, one or more predetermined traces to each instruction as it comes down the pipeline. The traces are stored in the trace buffer.

A computer system according to an embodiment of the present invention includes a memory and a CPU. The memory includes a trace buffer used to store records of the instruction tracing. Entries in the trace buffer are pointed to by a tracer pointer. The memory is coupled to the CPU via a bus interface unit. Instructions are passed from the memory to the CPU via the bus interface unit and are queued in an instruction cache, which includes a byte queue. The CPU further includes a control unit coupled to a control register, the tracer pointer and a maskable ROM. The control unit controls and activates the instruction tracing mechanism. In response to software setting a bit in the control register, the control unit functions to retrieve a special tracing microcode sequence from MROM to provide a trace record of the instructions as they are passed to the instruction decoders. Alternatively, a counting mechanism may be activated to count instructions and store the count in the memory. The computer system further includes a register file coupled to the instruction decoders and functional units, also coupled to instruction decoders, to receive and process the instructions.

The present invention further permits an instruction counting facility. More particularly, the trace buffer may be configured as an array of 32-bit counters indexible by the trace pointer. The counter facility counts occurrences of all instructions executed, maintaining a separate counter for each instruction. The counting mechanism permits an overall view of which instructions are used, and how often, for large programs. In addition, it provides a profile of register usage tied to instructions. Each counter in the array is 32-bits long; as such, there are four million counters. A twenty-two bit index is provided to each counter. Counting proceeds indefinitely until it is stopped manually. The counter is saturated at 0X FFFFFFFF rather than wrapping around to give an indication of overflow. The trace pointer register provides the base address to which the indexes are added to access a particular counter.

BRIEF DESCRIPTION OF THE DRAWINGS

A better understanding of the present invention can be obtained when the following detailed description of the preferred embodiment is considered in conjunction with the following drawings, in which:

FIG. 5 is a diagram of a taken branch record according to one embodiment of the present invention;

FIG. 6 is a diagram of a repeated string instruction information record according to one embodiment of the present invention;

FIG. 7 is a diagram of a repeated string early termination record according to one embodiment of the present invention;

FIG. 8 is a diagram of an exception/interrupt record according to one embodiment of the present invention;

FIG. 9 is a diagram of a task switch record according to one embodiment of the present invention;

FIG. 10 is a diagram of a special record for spring/CR3 conditions according to one embodiment of the present invention;

Figure 1:
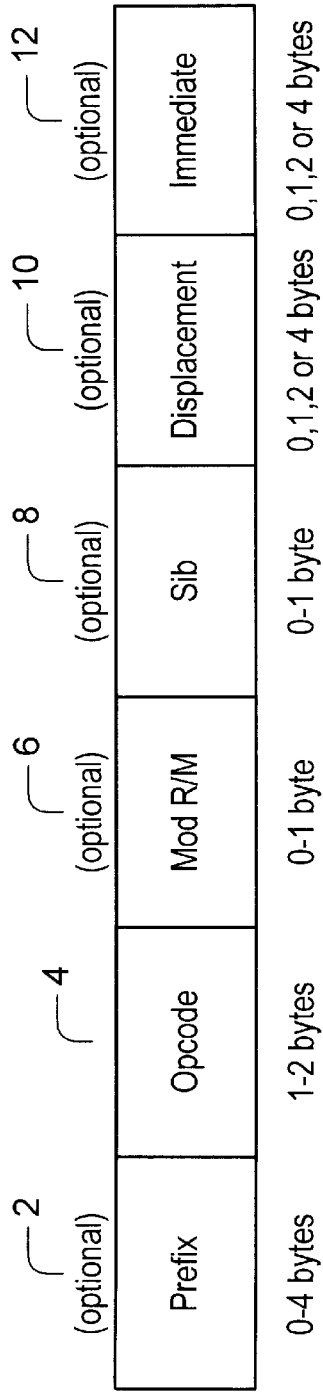
FIG. 1 is a diagram which illustrates the generic X-86 instructions of format.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a generic format illustrative of an X86 instruction is shown. As illustrated, an X86 instruction consists of from one to five optional prefix bytes 2 followed by an operation code (opcode) field 4, an optional addressing mode (Mod R/M) byte 6, an optional scale-index-base (SIB) byte 8, an optional displacement field 10, and an optional immediate data field 12. The opcode field 4 defines the basic operation for particular instruction. The default operation of a particular opcode may be modified by one or more prefix bytes 2. For example, a prefix byte may be used to change the address or operand size of an instruction, to override the default segment used in memory addressing, or to instruct the processor to repeat a string operation a number of times. The opcode field 4 follows the prefix byte or bytes may be one or two bytes in length. The addressing mode (Mod R/M) byte 6 specifies the registers used as well as memory addressing modes. The scale index base (SIB) byte 8 is used only in 32-bit base relative addressing using scale and index factors. A base field of the SIB byte specifies which register contains the base value for the address calculation and an index field specifies which register contains the index value. A scale field specifies a power of two by which the index value will be multiplied before being added along with any displacement to the base value. The next instruction field is the optional displacement field 10 which may be from one to four bytes in length. The displacement field 10 contains a constant used in address calculations. The immediate field 12, also optional, which may also be from one to four bytes in length, contains a constant used as an instruction operand. The shortest X86 instructions are only one byte long and comprise a single opcode byte.

Figure 2:
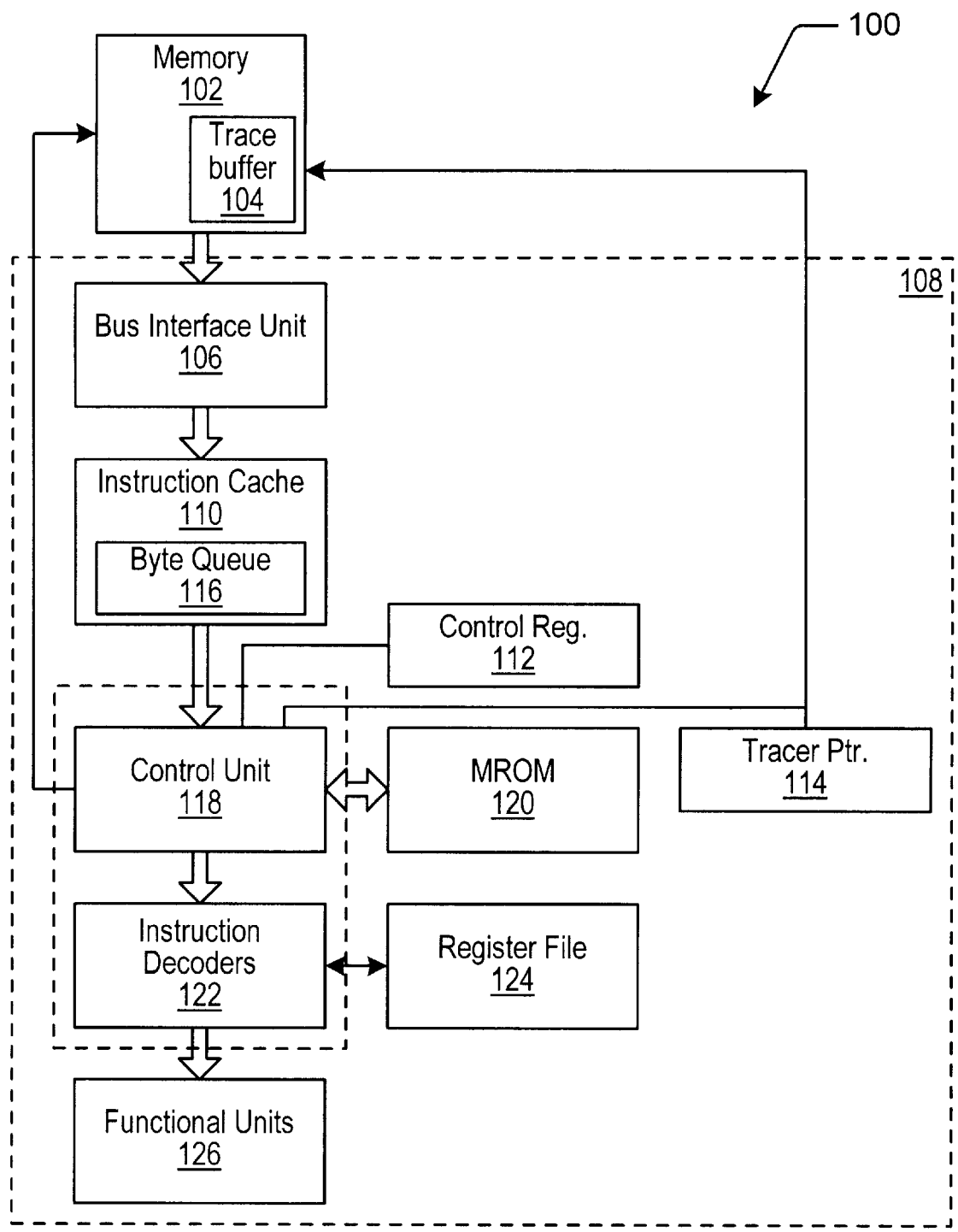
FIG. 2 is a block diagram of a computer system according to one embodiment of the present invention.

Turning now to FIG. 2, there is shown a block diagram of a computer system employing an instruction tracing mechanism according to the present invention. More particularly, FIG. 2 illustrates the instruction pipeline of the processor 108 of a computer system 100, employing instruction tracing in accordance with the present invention. Computer system 100 includes a memory 102 and a CPU 108. CPU 108 may be any of a variety of processors, but is preferably an x86 type superscalar processor. Memory 102 includes a trace buffer 104 used to store records of the instruction tracing, as will be described in more detail below. Entries in trace buffer 104 are pointed to by tracer pointer 114 (also as will be discussed in more detail below). Memory 102 is coupled to CPU 108 via a bus interface unit 106. Instructions are passed from memory 102 to the CPU via the bus interface unit 106 and are queued in an instruction cache 110, which includes a byte queue 116. CPU 108 further includes a control unit 118 coupled to a control register 112, tracer pointer 114 and MROM 120. Control unit 118 controls and activates the instruction tracing mechanism. In response to software setting a bit in control register 112, control unit 118 functions to retrieve a special tracing microcode sequence from MROM 120 to provide a trace record of the instructions as they are passed to instruction decoders 122. Computer system 100 further includes a register file 124 coupled to instruction decoders 122 and functional units 126, also coupled to instruction decoders 122 to receive the instructions. Additional details concerning CPU 108 are omitted for the sake of clarity.

The instruction tracing mechanism described above begins with trace pointer 114 being initialized to the start of trace buffer 104. In a preferred embodiment, trace pointer 114 is a model specific register and may be initialized with a write machine specific register (WRMSR) instruction. Tracing itself may be initiated by setting a trace enable bit in a control register 112. In a preferred embodiment, control register 112 is a hardware control register (HWCR), which again may be written to using a WRMSR instruction. In response, instruction decoder 122 will serialize instruction dispatch, but prior to dispatching each instruction, will dispatch a special tracing microcode sequence from MROM 120. This microcode routine, plus an additional number of short instruction class specific routines, provides the basis for implementing tracing capability.

Figure 3:
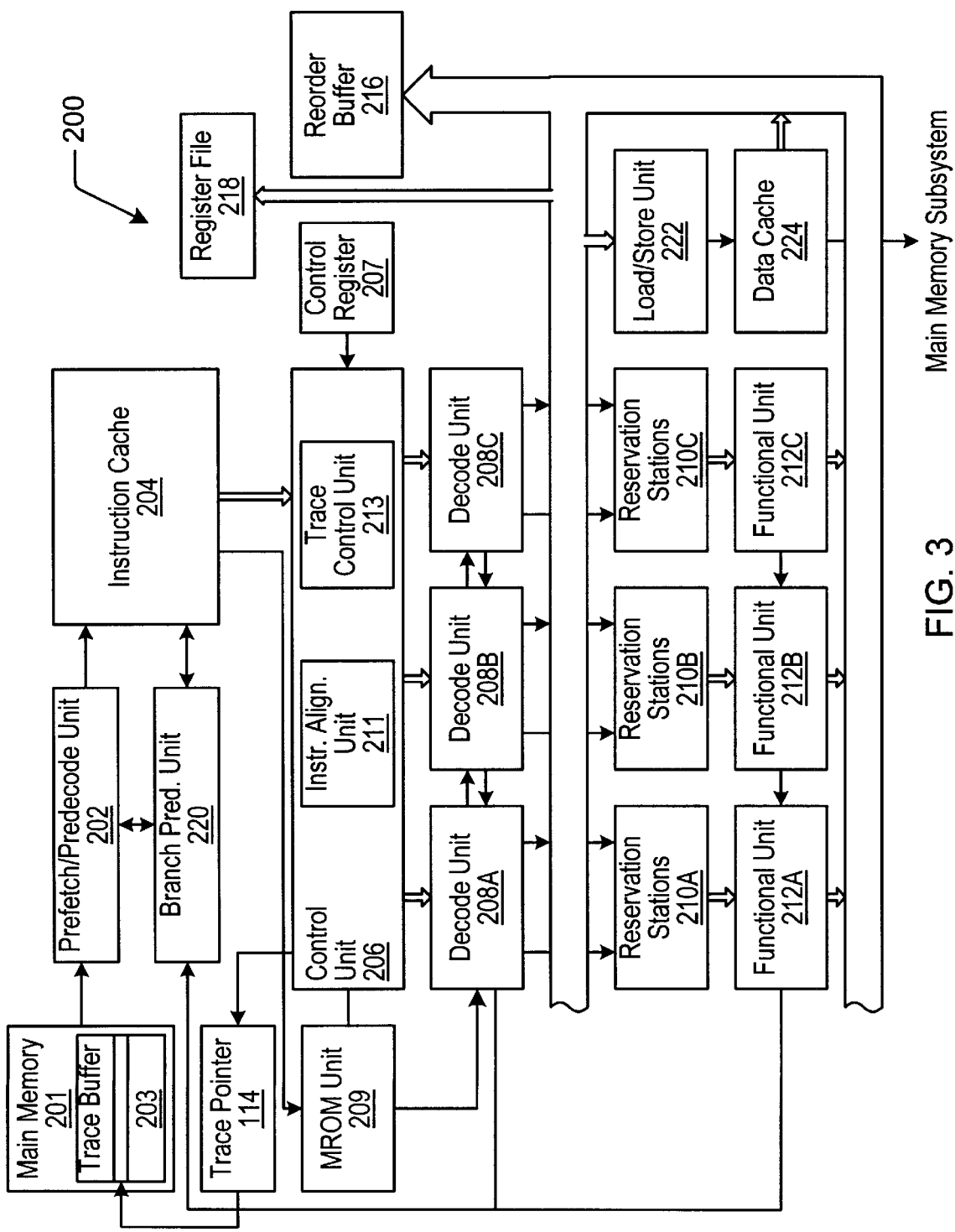
FIG. 3 is a block diagram of a processor according to one embodiment of the present invention.

Referring next to FIG. 3, a more detailed block diagram of a microprocessor 200 including a control unit 206 employing an instruction tracing mechanism is shown. As illustrated in FIG. 3, superscalar microprocessor 200 (preferably an X86 type processor) includes a prefetch/ predecode unit 202 and a branch prediction unit 220 coupled to an instruction cache 204. A main memory 201, typically separate from processor 200, is coupled to processor 200 by way of prefetch/predecode unit 202. Main memory 201 includes an area set aside as a trace buffer 203, as will be explained in more detail below. Instruction alignment unit 206 is coupled between instruction cache 204 and a plurality of decode units 208A–208C (referred to collectively as decode units 208). Each decode unit 208A–208C is coupled to a respective reservation station units 210A–210C (referred collectively as reservation stations 210), and each reservation station 210A–210C is coupled to a respective functional unit 212A–212C (referred to collectively as functional units 212). Decode units 208, reservation stations 210, and functional units 212 are further coupled to a reorder buffer 216, a register file 218 and a load/store unit 222. A data cache 224 is finally shown coupled to load/store unit 222, and an MROM unit 209 is shown coupled to instruction alignment unit 206 and control unit 206.

Generally speaking, instruction cache 204 is a high speed cache memory provided to temporarily store instructions prior to their dispatch to decode units 208. In one embodiment, instruction cache 204 is configured to cache up to 32 kilobytes of instruction code organized in lines of 16 bytes each (where each byte consists of 8 bits). During operation, instruction code is provided to instruction cache 204 by prefetching code from a main memory (not shown) through prefetch/precode unit 202. It is noted that instruction cache 204 could be implemented in a set-associative, a fully-associative, or a direct-mapped configuration.

Prefetch/predecode unit 202 is provided to prefetch instruction code from the main memory for storage within instruction cache 204. In one embodiment, prefetch/ predecode unit 202 is configured to burst 64-bit wide code from the main memory into instruction cache 204. It is understood that a variety of specific code prefetching techniques and algorithms may be employed by prefetch/ predecode unit 202.

As prefetch/predecode unit 202 fetches instructions from the main memory, it generates three predecode bits associated with each byte of instruction code: a start bit, an end bit, and a "functional" bit. The predecode bits form tags indicative of the boundaries of each instruction. The predecode tags may also convey additional information such as whether a given instruction can be decoded directly by decode units 208 or whether the instruction must be executed by invoking a microcode procedure controlled by MROM unit 209.

The X86 instructions that may be directly decoded by decode unit 208 are referred to as "fast path" instructions. The remaining instructions of the X86 instruction set are referred to as "MROM instructions". MROM instructions are executed by invoking MROM unit 209. When an MROM instruction is encountered, MROM unit 209 parses and serializes the instruction into a subset of defined fast path instructions to effectuate a desired operation.

Control unit 206 may include an instruction alignment unit 211 to channel or "funnel" variable byte length instructions from instruction cache 204 to fixed issue positions formed by decode units 208A–208C. In addition, control unit 206 includes trace a control unit 213 and is coupled to be activated by control register 207.

Before proceeding with a detailed description of the trace mechanism, general aspects regarding other subsystems employed within the exemplary superscalar microprocessor 200 of FIG. 3 will be described. For the embodiment of FIG. 3, each of the decode units 208 includes decoding circuitry for decoding the predetermined fast path instructions referred to above. In addition, each decode unit 208A–208F routes displacement and immediate data to a corresponding reservation station unit 210A–210C. Output signals from the decode units 208 include bit-encoded execution instructions for the functional units 212 as well as operand address information, immediate data and/or displacement data.

The superscalar microprocessor of FIG. 3 supports out of order execution, and thus employs reorder buffer 216 to keep track of the original program sequence for register read and write operations, to implement register renaming, to allow for speculative instruction execution and branch misprediction recovery, and to facilitate precise exceptions. As will be appreciated by those of skill in the art, a temporary storage location within reorder buffer 216 is reserved upon decode of an instruction that involves the update of a register to thereby store speculative register states. Reorder buffer 216 may be implemented in a first-in-first-out configuration wherein speculative results move to the "bottom" of the buffer as they are validated and written to the register file, thus making room for new entries at the "top" of the buffer. Other specific configurations of reorder buffer 216 are also possible, as will be described further below. If a branch prediction is incorrect, the results of speculatively-executed instructions along the mispredicted path can be invalidated in the buffer before they are written to register file 218.

The bit-encoded execution instructions and immediate data provided at the outputs of decode units 208A–208F are routed directly to respective reservation station units 210A–210F. In one embodiment, each reservation station unit 210A–210F is capable of holding instruction information (i.e., bit encoded execution bits as well as operand values, operand tags and/or immediate data) for up to three pending instructions awaiting issue to the corresponding functional unit. It is noted that for the embodiment of FIG. 3, each decode unit 208A–208F is associated with a dedicated reservation station unit 210A–210F, and that each reservation station unit 210A–210F is similarly associated with a dedicated functional unit 212A–212C. Accordingly, six dedicated "issue positions" are formed by decode units 208, reservation station units 210 and functional units 212. Instructions aligned and dispatched to issue position 0 through decode unit 208A are passed to reservation station unit 210A and subsequently to functional unit 212A for execution. Similarly, instructions aligned and dispatched to decode unit 208B are passed to reservation station unit 210B and into functional unit 212B, and so on.

Upon decode of a particular instruction, if a required operand is a register location, register address information is routed to reorder buffer 216 and register file 218 simultaneously. Those of skill in the art will appreciate that the X86 register file includes eight 32 bit real registers (i.e., typically referred to as EAX, EBX, ECX, EDX, EBP, ESI, EDI and ESP). Reorder buffer 216 contains temporary storage locations for results which change the contents of these registers to thereby allow out of order execution. A temporary storage location of reorder buffer 216 is reserved for each instruction which, upon decode, modifies the contents of one of the real registers. Therefore, at various points during execution of a particular program, reorder buffer 216 may have one or more locations which contain the speculatively executed contents of a given register. If following decode of a given instruction it is determined that reorder buffer 216 has previous location (s) assigned to a register used as an operand in the given instruction, the reorder buffer 216 forwards to the corresponding reservation station either: 1) the value in the most recently assigned location, or 2) a tag for the most recently assigned location if the value has not yet been produced by the functional unit that will eventually execute the previous instruction. If the reorder buffer has a location reserved for a given register, the operand value (or tag) is provided from reorder buffer 216 rather than from register file 218. If there is no location reserved for a required register in reorder buffer 216, the value is taken directly from register file 218. If the operand corresponds to a memory location, the operand value is provided to the reservation station unit through load/store unit 222.

Reservation station units 210A–210F are provided to temporarily store instruction information to be speculatively executed by the corresponding functional units 212A–212C. As stated previously, each reservation station unit 210A–210F may store instruction information for up to three pending instructions. Each of the six reservation stations 210A–210F contain locations to store bit-encoded execution instructions to be speculatively executed by the corresponding functional unit and the values of operands. If a particular operand is not available, a tag for that operand is provided from reorder buffer 216 and is stored within the corresponding reservation station until the result has been generated (i.e., by completion of the execution of a previous instruction). It is noted that when an instruction is executed by one of the functional units 212A–212C, the result of that instruction is passed directly to any reservation station units 210A–210F that are waiting for that result at the same time the result is passed to update reorder buffer 216 (this technique is commonly referred to as "result forwarding"). Instructions are issued to functional units for execution after the values of any required operand(s) are made available. That is, if an operand associated with a pending instruction within one of the reservation station units 210A–210F has been tagged with a location of a previous result value within reorder buffer 216 which corresponds to an instruction which modifies the required operand, the instruction is not issued to the corresponding functional unit 212 until the operand result for the previous instruction has been obtained. Accordingly, the order in which instructions are executed may not be the same as the order of the original program instruction sequence. Reorder buffer 216 ensures that data coherency is maintained in situations where read-after-write dependencies occur.

In one embodiment, each of the functional units 212 is configured to perform integer arithmetic operations of addition and subtraction, as well as shifts, rotates, logical operations, and branch operations. It is noted that a floating point unit (not shown) may also be employed to accommodate floating point operations.

Each of the functional units 212 also provides information regarding the execution of conditional branch instructions to the branch prediction unit 220. If a branch prediction was incorrect, instruction cache 204 flushes instructions not needed, and causes prefetch/predecode unit 202 to fetch the required instructions from main memory. It is noted that in such situations, results of instructions in the original program sequence which occur after the mispredicted branch instruction are discarded, including those which were speculatively executed and temporarily stored in load/store unit 222 and reorder buffer 216. Exemplary configurations of suitable branch prediction mechanisms are well known.

Results produced by functional units 212 are sent to the reorder buffer 216 if a register value is being updated, and to the load/store unit 222 if the contents of a memory location is changed. If the result is to be stored in a register, the reorder buffer 216 stores the result in the location reserved for the value of the register when the instruction was decoded. As stated previously, results are also broadcast to reservation station units 210A–210F where pending instructions may be waiting for the results of previous instruction executions to obtain the required operand values.

Generally speaking, load/store unit 222 provides an interface between functional units 212A–212C and data cache 224. In one embodiment, load/store unit 222 is configured with a store buffer with eight storage locations for data and address information for pending loads or stores. Functional units 212 arbitrate for access to the load/store unit 222. When the buffer is full, a functional unit must wait until the load/store unit 222 has room for the pending load or store request information. The load/store unit 222 also performs dependency checking for load instructions against pending store instructions to ensure that data coherency is maintained.

Data cache 224 is a high speed cache memory provided to temporarily store data being transferred between load/store unit 222 and the main memory subsystem. In one embodiment, data cache 224 has a capacity of storing up to eight kilobytes of data. It is understood that data cache 224 may be implemented in a variety of specific memory configurations, including a set associative configuration.

Instructions which are not included within the subset of X86 instructions designated as fast path instructions are executed under the control of MROM unit 209 using stored microcode. MROM unit 209 parses instructions into a series of fast path instructions which are dispatched during one or more clock cycles.

When an MROM instruction within a line of code in latching unit 202 is detected by MROM unit 209, this instruction and any following it are not dispatched during the current cycle. Any instruction(s) preceding it are dispatched in accordance with the above description. During the following clock cycle(s), MROM unit 209 provides series of fast path instructions to the decode units 208 through instruction alignment unit 206 in accordance with the microcode for that particular MROM instruction. Once all of the microcoded instructions have been dispatched to decode units 208 through alignment unit 206 to effectuate the desired MROM operation, the instructions which followed the MROM instruction are allowed to be dispatched.

The instruction tracing mechanism will now be described. An instruction tracing begins with trace pointer 205 being initialized to the start of trace buffer 203. In a preferred embodiment, trace pointer 114 is a model specific register (MSR) and may be initialized with a write machine specific register (WRMSR) instruction. Tracing itself may be initiated by setting a trace enable bit in a control register 207. In a preferred embodiment, control register 207 is a hardware control register (HWCR), which again may be written to using a WRMSR instruction. In response to setting the trace enable bit, trace control unit 213 will cause instruction decoders 208 to serialize instruction dispatch, but prior to dispatching each instruction, will cause a special tracing microcode sequence to be dispatched from MROM 209. This microcode routine, plus an additional number of instruction-class specific routines, provides the basis for implementing tracing capability.

In a preferred embodiment, a trace consists of one or more records of information. For each instruction, each record being four doublewords in size. Presently, seven types of records are defined, though this number may increase with relatively little difficulty. The types of records are set forth in Table 1 below:

TABLE 1

| Type | Record |
|------|--------|
| 0 | Basic |
| 1 | Taken Branch |
| 3 | Repeated String Instruction |
| 4 | Repeated String Early Termination |
| 5 | Task Switch |
| 6 | Special String/CR3 |
| 7 | Exception/Interrupt |

The Type 0 record, the basic record, is common to all instruction traces and contains basic information which is sufficient to completely describe most instructions. The use of the common record helps to optimize the space and overhead tradeoffs inherent in providing trace information.

Figure 4:
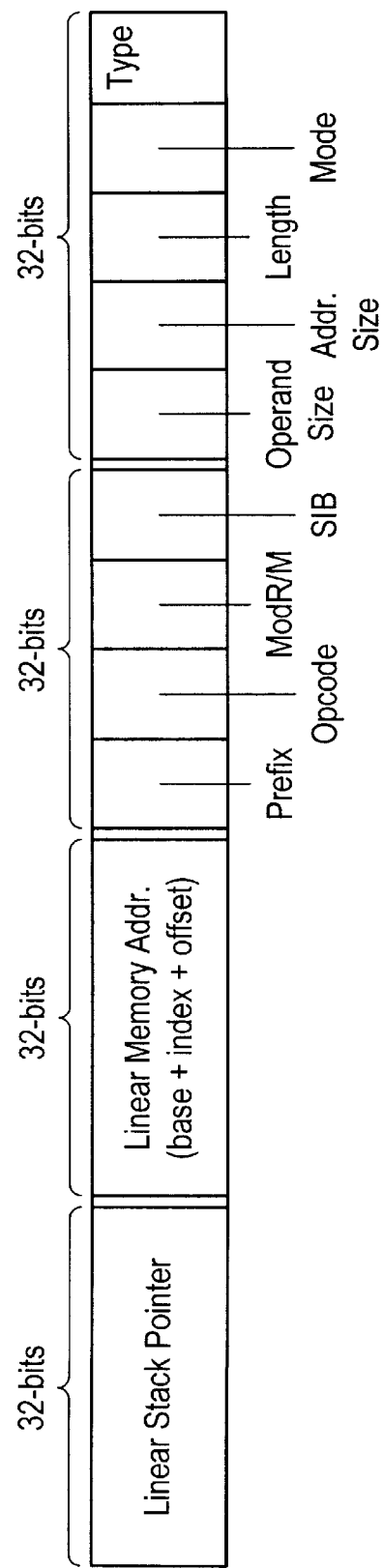
FIG. 4 is a diagram illustrating a basic trace record according to one embodiment of the present invention.

Turning now to FIG. 4, there is shown a diagram of the basic trace record common to all instructions. A first doubleword identifies the record Type (in this case Type 0), the processor mode (i. e., real, protected or V86), the instruction's length in bytes, and address and operand size. The record type may occupy four bits; the mode may occupy three bits and instruction length may occupy four bits. Another doubleword in the basic trace records contains an image of the opcode, the mode R/M bytes, the SIB bytes and a special summarized (encoded) form of any prefixes. The encoding of the basic record prefix byte is set forth in Table 2 below:

TABLE 2

| Basic Read Prefix Byte | |
|---|---|
| Two byte opcode | - - - - - - - 1 |
| Address size | - - - - - - 1 - |
| Operand size | - - - - - 1 - - |
| Lock | - - - - 1 - - - |
| Repne | - - - 1 - - - - |
| rep/repe | - - - 1 1 - - - |
| CS | - - 1 - - - - - |
| DS | - 1 - - - - - - |
| ES | - 1 1 - - - - - |
| FS | 1 - - - - - - - |
| GS | 1 - 1 - - - - - |
| SS | 1 1 - - - - - - |

The third doubleword stores the current linear stack pointer. A fourth doubleword stores the linear memory address. The trace pointer provides the address for each doubleword store and increments after each store.

In addition to this basic information, additional trace information may be needed. Thus, additional trace records are provided. Turning now to FIG. 5 there is shown a taken branch record (record Type 1 ) which is used after a basic record for branch and target instructions in a superscalar processor. A first doubleword of the taken branch record defines the record type, the processor mode and the target CS or code segment register. A second doubleword stores a target EIP or instruction pointer address. The third doubleword stores a linear target EIP or instruction pointer address. The fourth doubleword is not used at present.

Type 3 trace records are for repeated string instruction information records which follow the basic record for string instructions. Type 3 trace records are shown in FIG. 6. The first word stores the data type. The second word stores an initial ECX general register address. A third doubleword stores the initial linear ESI, or source index register. A fourth doubleword stores an initial linear EDI or destination index register.

A Type 4 record, shown in FIG. 7, is used for repeated string early termination recording. A first doubleword stores the record type and a second doubleword stores the final ECX. The remaining two doublewords are as yet undefined.

Type 7 records are shown in FIG. 8 and are exception/interrupt records. A first doubleword stores the record Type in four bits, the processor mode in three bits, the reason for the interrupt in eight bits and an interrupt vector, also in eight bits. A second doubleword stores the ECX. The remaining two doublewords are as yet undefined.

FIG. 9 illustrates the task switch record or Type 5 record. The task switch record is preferably implemented via patch microcode. The task switch record is used to define task switches and relates to a multitasking environment. A first doubleword defines the record type in four bits, the mode in three bits and the reason for the task switch in eight bits. A second doubleword defines the outgoing task state segment (TSS) base address and a third doubleword defines the incoming TSS base address. The fourth doubleword is as yet undefined.

FIG. 9 illustrates a record of string/CR3 instructions. The first doubleword defines the record type (Type 6). A second doubleword stores the linear ESI for non-repeated string instructions after execution. The third doubleword records the linear EDI for non-repeated string instructions after execution. The fourth doubleword defines the CR3 register on move to CR3.

Referring once again to FIG. 2, it is to be noted that there is a finite amount of memory available to collect each trace.

However, it is desirable to be able to collect traces of any length. Accordingly, a mechanism is required to suspend processor operation when the trace buffer 203 fills and emptying the trace buffer 203 by transferring the contents to another storage area, such as a hard drive or disk drive, and resume tracing at the point of suspension. A buffer full condition can occur at any time during system operation, including critical times during which the system could not handle an interrupt or exception. Accordingly, it is important that the suspend-dump-resume operation be transparent to the system. The present invention accommodates this through the use of the SMI or system management interrupt facility. Prior to writing a basic instruction record, the trace pointer is checked against a predetermined limit. If this limit is reached, then the trace record is not written. Instead, tracing is turned off and an internal SMI is generated. The SMI causes the normal action of saving the stage of the processor in the SMM save area and transfers control to the SMI handler. The SMI handler then transfers the trace buffer contents to another storage medium such as a disk drive or out a serial or parallel port to a receiving device, such as another computer system. The handler then resets the trace pointer, reenables tracing and switches back to normal execution via the SRM instruction to resume system operation.

Figure 11A:
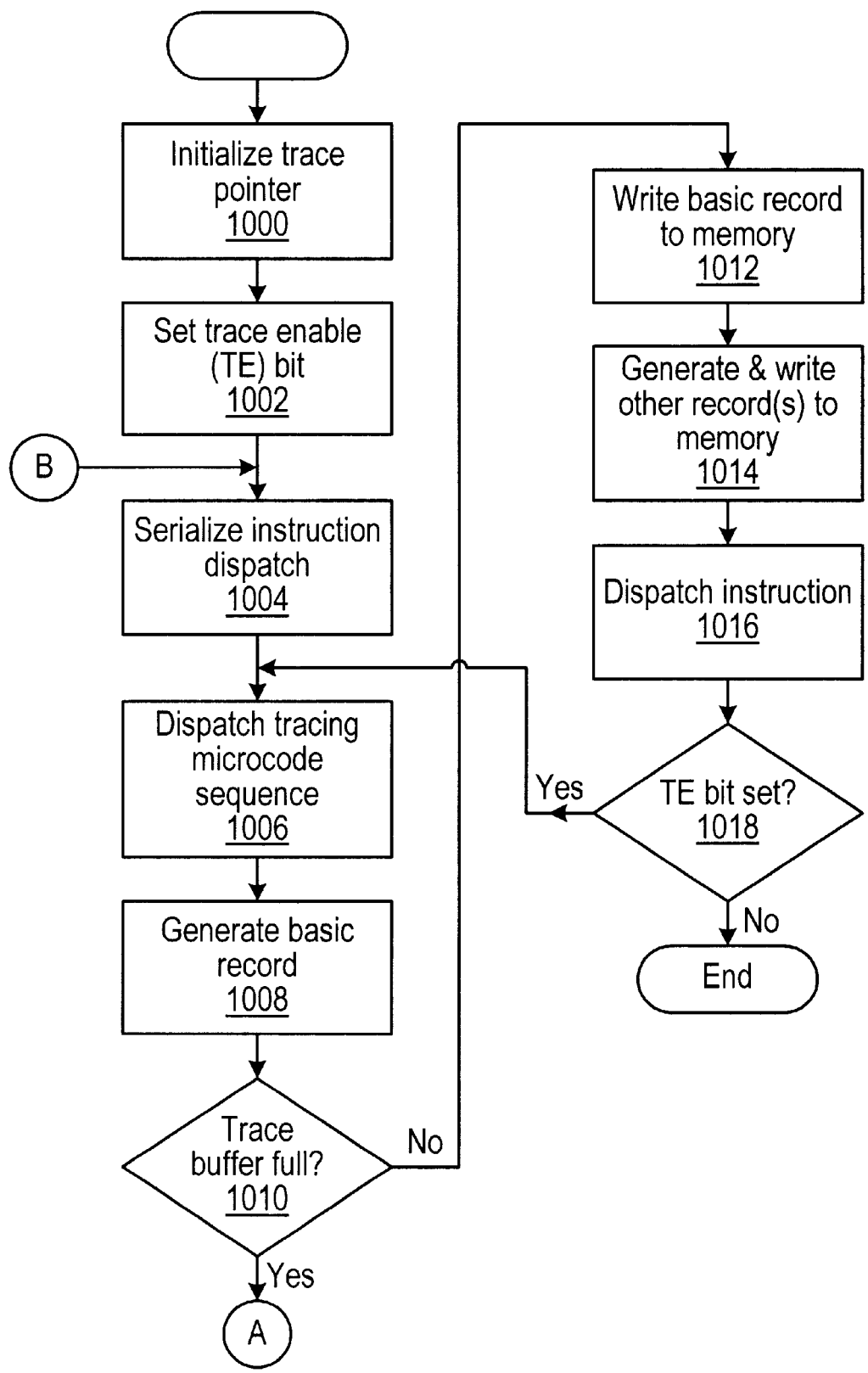
FIGS. 11a and 11b illustrate a flowchart showing operation of one embodiment of the present invention.
Figure 11B:
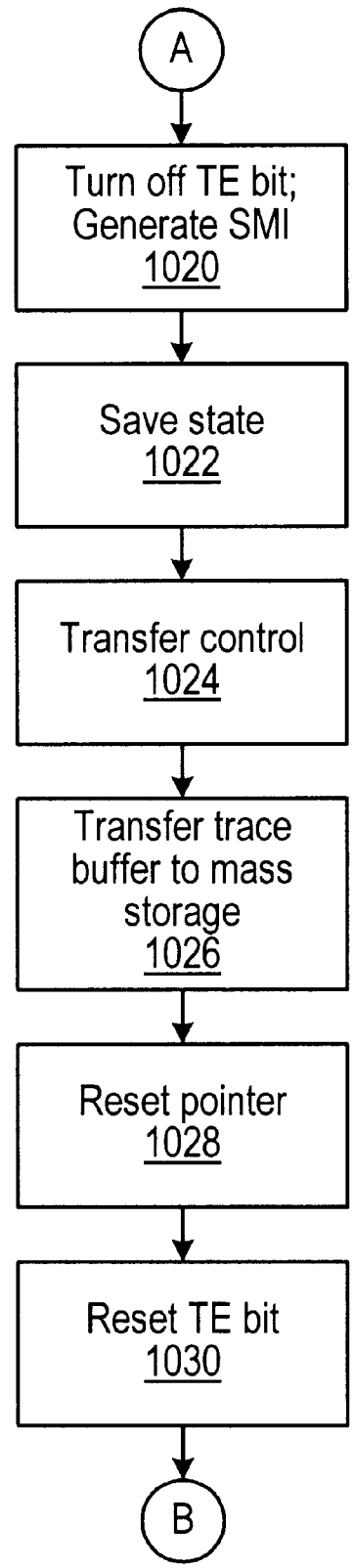

Turning now to FIGS. 11a and 11b, there is shown a flow chart illustrating operation of the tracing mechanism described above. Upon receiving either a software command internally from the CPU, or externally, via the JTAG hardware debug tool, the trace pointer is initialized (Step 1000). The trace pointer is initialized by setting it to the start of the trace buffer; it may be written to through a write machine specific register instruction. Next, the trace enable bit in a control register is set to initialize starting of the trace process (Step 1002). This again may occur through a write machine specific register command to a hardware control register. Next, the instruction decoder serializes instruction dispatch (Step 1004). In addition, a tracing microcode sequence is dispatched by the control unit 118 from MROM 209 (Step 1006). This causes a basic trace record to be generated (Step 1008). If the trace buffer is full, as denoted by the incremented trace pointer, the trace enable bit will be turned off and a system management interrupt will be generated (Step 1020). This causes the state of the processor to be saved (Step 1022) and control to be transferred to the SMI handler (Step 1024). The SMI handler may then transfer the contents of the trace buffer to a mass storage device or another computer via a serial or parallel port (Step 1026). The trace pointer is then reset (Step 1028) and the trace enable bit in the control register is also reset (Step 1030). Once the trace enable bit is reset the routine will continue from Step 1004 and will proceed with the trace recording as before. If in Step 1010 the trace buffer were not in fact full, the basic record generated in Step 1008 would be written to the trace buffer in memory (Step 1012). At this stage, any other necessary records of Types 1–7, for example, would be generated and written to memory (Step 1014). Once the trace record had been recorded the instruction itself would be dispatched, for example, to functional units 126 (Step 1016). If the trace enable bit is still set the tracing will continue for each instruction. If not, the process will end.

While in a preferred embodiment, all instructions are traced, variations such as branch tracing are also contemplated. It is to be noted that while the above invention has been described providing tracing for all code it is also possible to enable tracing for only certain code sequences. For example, one method of doing so is to redefine the EFLAGS TF bit to enable microcode-based tracing rather than software-based tracing. Another method is to enable tracing only for user code (CPL3). Further, the control unit may define a process identifier whereby the system associates a unique code to each active process or thread and a mechanism whereby tracing is done only for that process. A tracing ID value stored in a register would be compared with a process ID register value to enable the tracing. The operating system could change the process ID register as part of a context switch. Finally, tracing might be enabled by a bit or code in either a code segment descriptor, page descriptor entry or page table entry.

In a selective tracing system it may be possible for system software to manage the trace buffer. Instead of an SMI, a "buffer full" condition could generate an exception using a programmable vector or a debug interrupt vector. The exception handler would empty the buffer and resume tracing within the system environment. Accordingly, features such as virtual memory and the file system could be traced.

Figure 12:
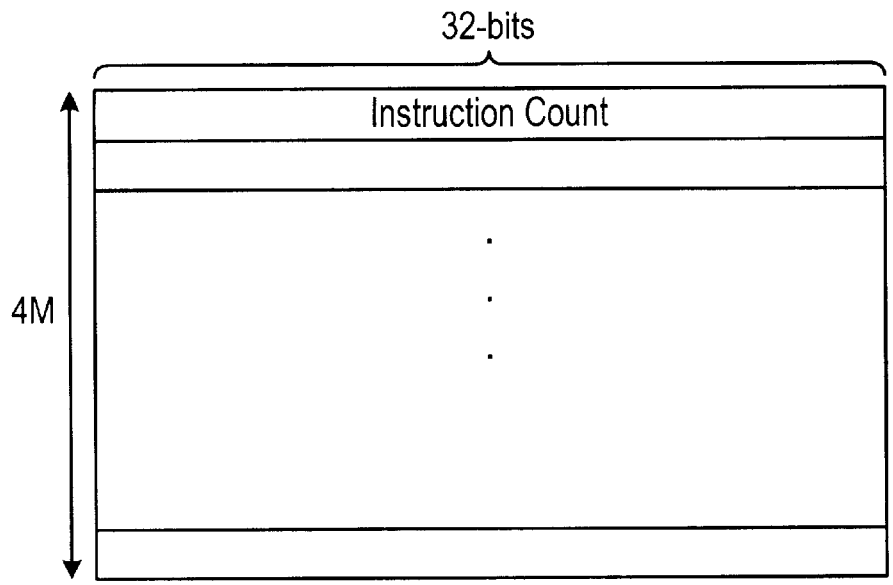
FIG. 12 illustrates a counter array according to one embodiment of the present invention.
Figure 13:
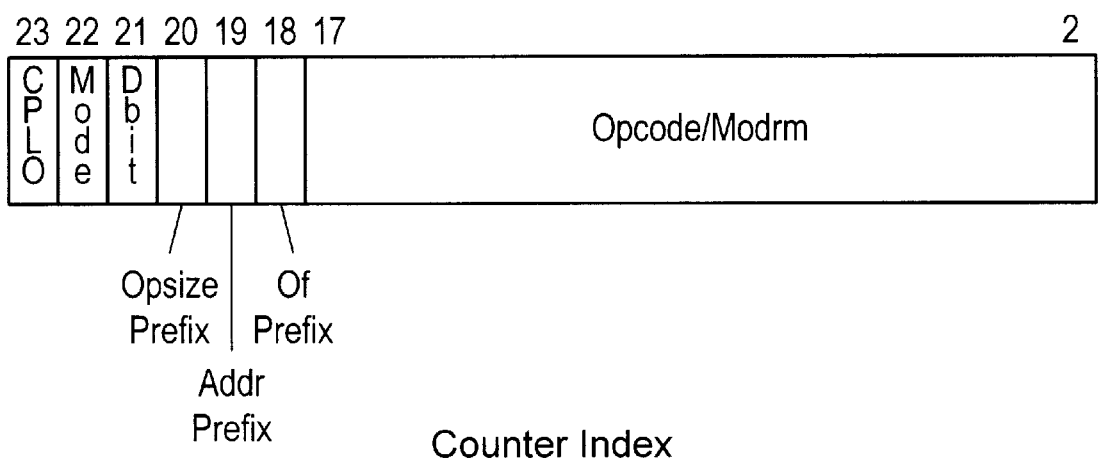
FIG. 13 is a diagram of a counter index according to one embodiment of the present invention.

The present invention further permits an instruction counting facility rather than instruction tracing. More particularly, the trace buffer may be configured as an array of 32-bit counters indexible by the trace pointer. The 16 megabyte area of memory is set aside for use as the counters. The counter facility counts occurrences of all instructions executed, maintaining a separate counter for each instruction. The counting mechanism permits an overall view of which instructions are used, and how often, for large programs. In addition, it provides a profile of register usage tied to instructions. Turning to FIG. 12, there is shown a diagram of the counter array. Each counter is 32-bits long; as such, there are four million counters. The index to each counter is illustrated in FIG. 13. One bit is a CPL0 bit, which distinguishes supervisor mode from user mode. The next bit defines the processor mode as real or V86. A third bit is a D bit, which distinguishes 32-bit code from 16-bit code. Another bit is an opsize prefix; another an address prefix; another a 0F prefix. The remaining bytes of the index are an opcode and Mod R/M field. The Mod R/M field is actually whatever byte follows the opcode code, which could be a portion of immediate operand or the first byte of the next instruction. The total count for a given instruction must be determined by adding the values from several counters.

Counting proceeds indefinitely until it is stopped manually. The counter is saturated at 0X FFFFFFFF rather than wrapping around to give an indication of overflow. Thus, a 22 bit index is used for the four million 32-bit counters. The trace pointer register provides the base address to which the indexes are added to access a particular counter.

Figure 14:
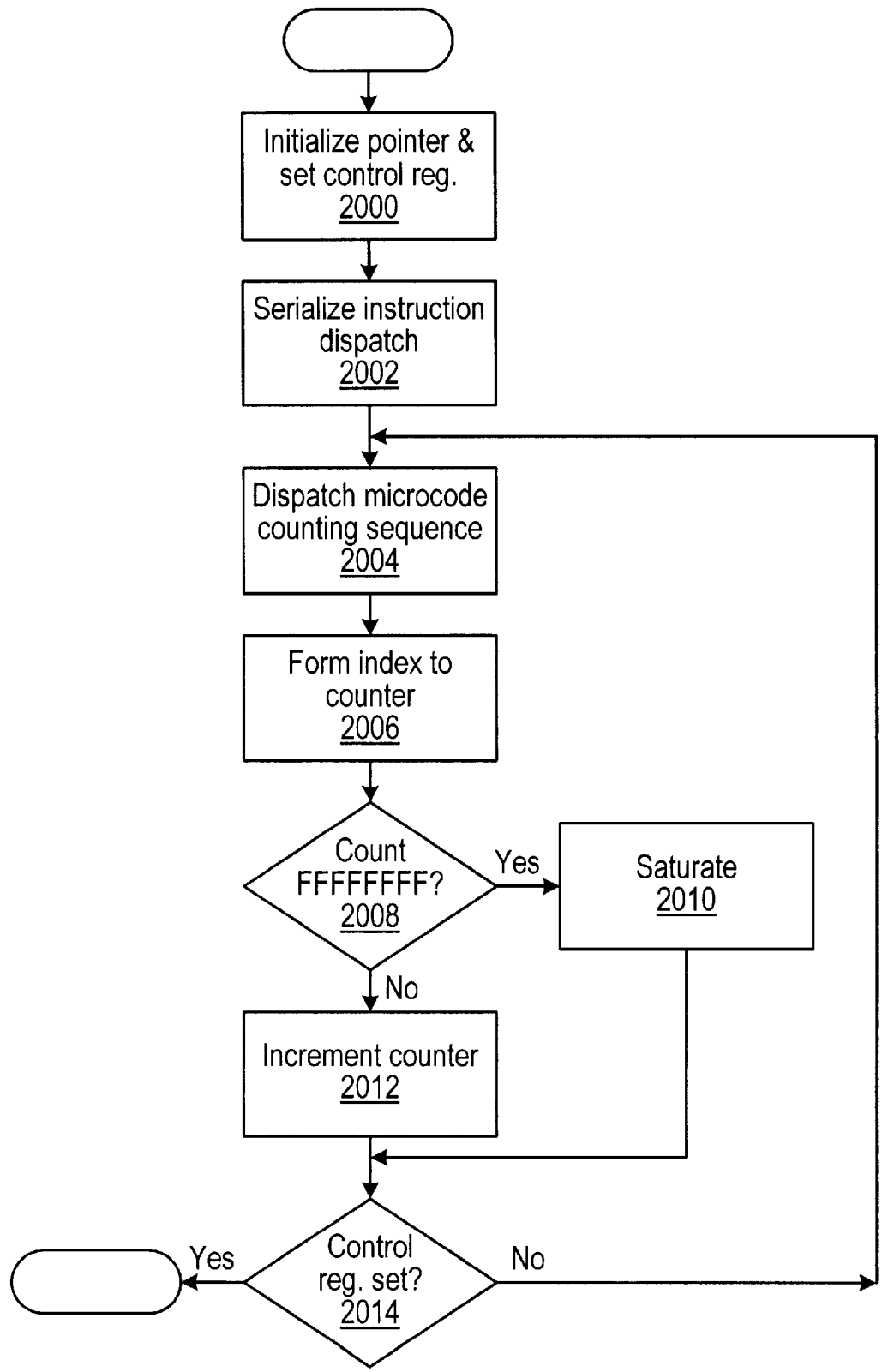
FIG. 14 is a flowchart illustrating operation of a counting mechanism according to one embodiment of the present invention.

Operation of the counting facility is similar to the tracing facility described above and is described in greater detail with respect to FIG. 14. Turning now to FIG. 14 there is shown a flow chart illustrating the counting process. The process is begun by initializing the trace pointer and setting the appropriate bit or bits in the control register (Step 2000). As in the tracing mechanism, the control register is preferably a hardware control register HWCR and is written to with a write model specific register command. Next the instruction dispatch is serialized (Step 2002). Once the counting facility has been initialized and activated, a microcode counting sequence will be dispatched that uses the opcode with other information from the next instruction to form an index into the reserved memory. It is noted that if no Mod R/M byte is available, for example in the case of a one byte instruction, this portion of the index will be undefined. As such, the count for a particular one byte opcode will be spread out over 256 counters. However, it is relatively simple for post processing software to consolidate these values. As discussed above, additional index bits used to distinguish instructions may reflect the operand size, use of operand and index address size prefixes and the processor mode. The trace pointer register provides the base address to which indexes are added to access a particular counter. If the count in the counter is FFFFFFFF the counter will saturate and not wrap around (Steps 2008 and 2010). If, however, the count is below the counter will be implemented in Step 2012. If the control register is still set for instruction counting the next instruction will be processed as above. If, however, the control register has been reset, the process will terminate and the post processing software will read the results.

The invention described in the above-detailed description is not intended to be limited to the specific form set forth herein, but on the contrary, it is intended to cover such alternatives, modifications, and equivalents as can reasonably be included within the spirit and scope of the invention as defined by the appended claims.

What is claimed is:

1. A microprocessor comprising:
    an instruction cache configured to store a plurality of instructions forming an instruction stream;
    at least one decoder configured to decode said plurality of instructions upon fetch thereof from said instruction cache; and
    an instruction trace control unit coupled between said instruction cache and said at least one decoder, said instruction trace control unit configured to provide a trace record of each one of said plurality of instructions, wherein said trace record of said each one of said plurality of instructions comprises a basic trace record, and wherein said basic trace record includes information identifying at least one of: (i) an operand addressing mode and (ii) a memory addressing mode employed by said one of said plurality of instructions corresponding to said basic trace record.

2. The microprocessor of claim 1, further including an MROM unit coupled to said instruction trace control unit and configured to provide an instruction tracing routine responsive to a command from said instruction trace control unit.

3. The microprocessor of claim 2, wherein said instruction trace control unit provides said command responsive to the setting of a bit in a control register.

4. The microprocessor of claim 1, wherein said instruction trace control unit is further coupled to a tracer pointer register, wherein said tracer pointer register is configured to provide a pointer to a location in memory wherein said trace record of said each one of said plurality of instructions is stored.

5. A microprocessor comprising:
    an instruction cache configured to store a plurality of instructions forming an instruction stream;
    at least one decoder configured to decode said plurality of instructions upon fetch thereof from said instruction cache; and
    an instruction counter control unit coupled between said instruction cache and said at least one decoder, said instruction counter control unit configured to control a counting mechanism, said counting mechanism configured to count a number of occurrences of each instruction defined in an instruction set executable by said microprocessor.

6. The microprocessor of claim 5, further including an MROM unit coupled to said instruction counter control unit and configured to provide an instruction counting routine responsive to a command from said instruction counter control unit.

7. The microprocessor of claim 6, wherein said instruction counter control unit provides said command responsive to the setting of a bit in a control register.

8. The microprocessor of claim 5, wherein said instruction counter control unit is further coupled to a tracer register, wherein said tracer register is configured to provide a base address of a region of memory configured to store counters generated by said instruction counter control unit.

9. A computer system, comprising:
    a processor including:
        an instruction cache configured to store a plurality of instructions forming an instruction stream;
        at least one decoder configured to decode said plurality of instructions upon fetch thereof from an instruction cache; and
        an instruction trace control unit coupled between said instruction cache and said at least one decoder, said instruction trace control unit configured to provide a trace record of each one of said plurality of instructions, wherein said trace record of said each one of said plurality of instructions comprises a basic trace record, and wherein said basic trace record includes information identifying at least one of: (i) an operand addressing mode and (ii) a memory addressing mode employed by said one of said plurality of instructions corresponding to said basic trace record; and
    a memory unit having a predetermined region configured to store said trace record.

10. The computer system of claim 9, wherein said processor includes a tracer pointer register configured to point to a location in said predetermined region of said memory corresponding to where said trace record corresponding to a particular one of said plurality of instructions is to be stored.

11. The computer system of claim 10 further comprising a storage device external to said memory, wherein said processor is configured to monitor whether said predetermined region of said memory is full, and activate a routine to save contents of said predetermined region of said memory to said storage device.

12. The computer system of claim 11, wherein said routine is activated by generating a system management interrupt.

13. The computer system of claim 11, wherein said monitor compares a value of said tracer pointer to a predetermined value, and activates said routine if said tracer pointer is equal to said predetermined value.

14. The computer system as recited in claim 12, wherein said instruction trace control unit is configured to resume providing said trace records after said routine saves said contents of said predetermined region of said memory to said storage device.

15. A microprocessor comprising:
    an instruction cache configured to store a plurality of instructions forming an instruction stream;
    at least one decoder configured to decode said plurality of instructions upon fetch thereof from said instruction cache; and
    an instruction trace control unit coupled between said instruction cache and said at least one decoder, said instruction trace control unit configured to provide a trace record of each one of said plurality of instructions, wherein said trace record of said each one of said plurality of instructions comprises a basic trace record, and wherein said basic trace record includes information identifying at least one of: (i) an operand addressing mode and (ii) a memory addressing mode employed by said one of said plurality of instructions corresponding to said basic trace record, and wherein said trace record further comprises one or more additional trace records, each of said basic trace record and said one or more additional trace records including a trace type which identifies said basic trace record and said additional trace records.

16. The microprocessor as recited in claim 15 wherein said additional trace records comprise a taken branch record.

17. The microprocessor as recited in claim 15 wherein said additional trace records comprise a repeated string instruction information record and a repeated string early termination record.

18. The microprocessor as recited in claim 15 wherein said additional trace records comprise an exception/interrupt record.

19. The microprocessor as recited in claim 15 wherein said additional trace records comprise a task switch records.

20. The microprocessor as recited in claim 15 wherein said additional trace records comprise a special record for string/CR3 conditions.

21. A microprocessor comprising:
   an instruction cache configured to store a plurality of instructions forming an instruction stream;
   at least one decoder configured to decode said plurality of instructions upon fetch thereof from said instruction cache; and
   an instruction counter control unit coupled between said instruction cache and said at least one decoder, said instruction counter control unit configured to control a counting mechanism, said counting mechanism configured to count a number of occurrences of each instruction defined in an instruction set executable by said microprocessor, and wherein said instruction counter control unit is further coupled to a tracer register, wherein said tracer register is configured to provide a base address of a region of memory configured to store counters generated by said instruction counter control unit, and wherein said microprocessor is configured to form an index into said region of memory to select one of said counters corresponding to one of said plurality of instructions, said index comprising: (i) one or more bits indicative of a mode in which said microprocessor is operating, (ii) one or more bits indicative of a mode of an instruction, (iii) an opcode of said one of said plurality of instructions, and (iv) an addressing mode of said one of said plurality of instructions.

22. A computer system, comprising:
   a processor including:
      an instruction cache configured to store a plurality of instructions forming an instruction stream;
      at least one decoder configured to decode said plurality of instructions upon fetch thereof from an instruction cache; and
      an instruction trace control unit coupled between said instruction cache and said at least one decoder, said instruction trace control unit configured to provide a trace record of each one of said plurality of instructions, wherein said trace record of said each one of said plurality of instructions comprises a basic trace record, and wherein said basic trace record includes information identifying at least one of: (i) an operand addressing mode and (ii) a memory addressing mode employed by said one of said plurality of instructions corresponding to said basic trace record, and wherein said trace record further comprises one or more additional trace records, each of said basic trace record and said one or more additional trace records including a trace type which identifies said basic trace record and said additional trace records; and
   a memory unit having a predetermined region configured to store said trace record.

* * * * *